United States Patent
Shimajiri

(10) Patent No.: US 10,767,895 B2
(45) Date of Patent: Sep. 8, 2020

(54) AIR FLOW DIRECTION REGULATION DEVICE

(71) Applicant: NIFCO INC., Yokosuka-shi, Kanagawa (JP)

(72) Inventor: Naohiro Shimajiri, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 126 days.

(21) Appl. No.: 16/315,478

(22) PCT Filed: Jul. 3, 2017

(86) PCT No.: PCT/JP2017/024296
§ 371 (c)(1),
(2) Date: Jan. 4, 2019

(87) PCT Pub. No.: WO2018/008578
PCT Pub. Date: Jan. 11, 2018

(65) Prior Publication Data
US 2019/0309982 A1    Oct. 10, 2019

(30) Foreign Application Priority Data
Jul. 6, 2016    (JP) .................................. 2016-133905

(51) Int. Cl.
*F24F 13/14* (2006.01)
*B60H 1/34* (2006.01)
*F24F 13/15* (2006.01)

(52) U.S. Cl.
CPC .......... *F24F 13/1413* (2013.01); *B60H 1/34* (2013.01); *B60H 1/3428* (2013.01); *F24F 13/15* (2013.01);
(Continued)

(58) Field of Classification Search
CPC ........ F24F 13/1413; F24F 13/15; B60H 1/34; B60H 1/3428; B60H 2001/3471; B60H 2001/3492
(Continued)

(56) References Cited

U.S. PATENT DOCUMENTS 10,112,459 B2 * 10/2018 Inagaki ................ B60H 1/3428
2015/0202946 A1    7/2015 Inagaki et al.

FOREIGN PATENT DOCUMENTS

GB          1407992 B      10/1975
JP       S60-184713 U      12/1985
(Continued)

OTHER PUBLICATIONS

PCT/ISA/210, "International Search Report for International Application No. PCT/JP2017/024296," dated Jul. 3, 2017.

*Primary Examiner* — Jessica Yuen
(74) *Attorney, Agent, or Firm* — Manabu Kanesaka

(57) ABSTRACT

An air flow direction regulation device includes a plurality of fins turnably supported; an approximately cylindrical housing arranging an operation portion or a gear mechanism for allowing a direction of each of the fins to be regulated; and a case disposing the housing internally. The fin is turnably supported as support points by an outer pivot portion on a housing inner circumferential side and an inner pivot portion on a housing center axis line side, and includes a gear portion provided near the inner pivot portion. The gear mechanism includes a gear integrally rotating with the operation portion through a shaft to engage the gear portion of each fin. The housing includes a flexible shaft support member provided on a housing center axis line, and forming a connection portion fitting into the inner pivot portion of each fin, and a through hole inserting the shaft to pass through.

8 Claims, 12 Drawing Sheets

(52) U.S. Cl.
CPC ................ *B60H 2001/3471* (2013.01); *B60H 2001/3492* (2013.01)

(58) Field of Classification Search
USPC ................................................ 454/152, 154
See application file for complete search history.

(56) References Cited

FOREIGN PATENT DOCUMENTS

| | | |
|---|---|---|
| JP | 2002-168511 A | 6/2002 |
| JP | 2014-034280 A | 2/2014 |
| JP | 2014-088115 A | 5/2014 |
| JP | 2014-172549 A | 9/2014 |

* cited by examiner

AIR FLOW DIRECTION REGULATION DEVICE

FIELD OF TECHNOLOGY

The present invention relates to an air flow direction regulation device.

BACKGROUND ART

FIGS. 11(a) and 11(b) are disclosed in Patent Document 1. An air flow direction regulation device (a register in the same Document) forms an air diffuser provided in, for example, an instrument panel of an automobile, and is a type comprising a plurality of fins 23; a housing (a frame in the same Document) in which an operation portion 6 or a gear mechanism for allowing a direction of each fin to be regulated is arranged; and a case (a retainer in the same Document) 1 in which the housing 20 is disposed internally.

In FIGS. 11(a) and 11(b), each fin 23 is turnably supported at support points of outside support shafts 24 on a housing inner circumferential side and shaft support portions 4 of a center shaft support portion 3 provided on a housing center axis line side. A gear (a bevel gear) mechanism is formed by gear portions (bevel gear pieces in the same Document) 25 provided in respective fin base end side cylinder portions 27 fitted into the shaft support portions 4, and a gear (a bevel gear portion in the same Document) 51 integrally rotating with the operation portion 6 to engage with the gear portions 25 of the respective fins. The gear 51 is connected to the operation portion 6 through a shaft portion 52, and rotates in the same direction by a rotation of the operation portion 6. Also, the center shaft support portion 3 includes a load imparting member 7 disposed in a cavity opening at a back face side and formed by an elastic member; the shaft support portions 4 provided to project at each face of a pentagon; and a center shaft 31 provided to project on a front face. The center shaft support portion 3 is supported in a state wherein a ball 81 of a ball joint 8 held in a back-side support frame 12 of the case 1 fits in the load imparting member 7 so as to be variable freely to an arbitrary angle of top and bottom, and right and left at a support point of the ball 81. Each shaft support portion 4 fits into the cylinder portion 27 of the corresponding fin. The center shaft 31 fits into the shaft portion 52 of the gear 51.

Then, FIG. 11(a) shows a usual ventilation state wherein each fin 23 is disposed approximately parallel to a center axis line S1 of the housing. In each fin 23, the gear 51 rotates by a rotation operation of the operation portion 6, and each fin 23 rotates through each gear portion 25 engaged with the gear 51 so as to be switched to a diffusion ventilation state which is disposed approximately obliquely relative to the center axis line S1 or a closed state which is disposed approximately at a right angle. Also, the housing 20 is variably regulatable in an arbitrary direction of the top and bottom, and the right and left at the support point of the ball 81 of the ball joint relative to the case 1.

On the other hand, FIGS. 12(a) and 12(b) are disclosed in Patent Document 2 as another conventional example in a case wherein the aforementioned housing is variably regulated in the arbitrary direction of the top and bottom, and the right and left relative to the case. In that structure, in the case 1, there is provided a partial concave spherical face 11 on an inner circumferential face, and at an opposed position of the inner circumferential face, there is formed a pair of sliding grooves 12 and 13 approximately in parallel to a center line. In a housing 3, there is provided a partial convex spherical face 3a on an outer circumferential face, and there are formed support shafts 28 and 29 located on the outer circumferential face to fit into the sliding grooves 12 and 13, and projections 34 and 35 contactable with a case inner circumferential face. In the aforementioned structure, when the housing 3 is operated to turn in the arbitrary direction of the top and bottom, and the right and left, the housing 3 turns around the support shafts 28 and 29, and the support shafts 28 and 29 move inside the sliding grooves 12 and 13, and the whole housing turns around a center point on the center line.

PRIOR ART DOCUMENT

Patent Document

Patent Document 1: Japanese Unexamined Patent Application Publication No. 2014-88115
Patent Document 2: Japanese Unexamined Patent Application Publication No. 2014-172549

SUMMARY OF THE INVENTION

Problems to be Solved by the Invention

In the structure of the aforementioned Patent Document 1, air is blown out through an air outlet in a direction according to an angle of each fin, or as a swirl flow so as to reasonably obtain a mild airflow blow. However, from the following viewpoints, the structure of the Patent Document 1 is still unsatisfactory.

(a) The housing 20 is divided into a front side portion 21 and a back side portion 22 so as to have multiple components and require a number of assembly steps as well. As a countermeasure for this, in a case wherein the housing 20 is simplified as a single part, this time, it becomes difficult to incorporate each fin 26 inside the housing in a state wherein each fin 26 is supported in the center shaft support portion 3. Namely, in a state wherein each fin 26 is assembled relative to the center shaft support portion 3 through fitting between the cylinder portion 27 and the shaft support portion 4, each support shaft 24 on an outer circumference of each fin has to fit into a corresponding concave portion or shaft hole on a housing inner circumferential face by pushing into an inside of the housing 20 together with the center shaft support portion 3. However, even in case each support shaft 24 is attempted to fit into the corresponding concave portion or shaft hole on the housing inner circumferential face, the housing corresponding portion is difficult to be displaced outwardly so as to be impossible to fit or impair assembly workability.

(b) The housing 20 can be variably regulated in the arbitrary direction of the top and bottom, and the right and left at the support point of the ball 81 of the ball joint relative to the case 1. Regarding that support structure, it is explained such that the housing 20 and an inner face of the case 1 do not contact, and tilt around the ball 81 at a tip of the ball joint, so that as in the case of a conventional device, comparing with a turning support by a contact between an inside sphere of an outer frame and an outside sphere of an inner frame, a variation in an operation load caused by a dimensional error, or feeling of firmness does not occur so as to obtain a feeling of a stable smooth operation. However, in that support structure, since the back-side support frame 12 which supports the ball joint 8 is located at a center of an air flow channel, not only it becomes a factor of disturbing a ventilation state, but also it is difficult to secure rigidity. In case the rigidity becomes insufficient, at a time of a swinging operation which tilts the housing to the top and bottom, and the right and left, a movement of an axial runout other than a movement of a rotation occurs so as to impair a quality. Also, in case the swinging operation is carried out to the housing only by a slight angle, there is a possibility that the housing might move only as much as the axial runout without the rotation.

(c) Incidentally, in a support structure of the Patent Document 2, in order to provide a smooth operation without rattling and with a moderate resistance as a sliding portion, a considerable advanced dimensional control is necessary for the sliding grooves 12 and 13 on the case inner circumferential face; the support shafts 28 and 29 on a housing outer circumferential face; and the projections 34 and 35 on the case inner circumferential face and the housing outer circumferential face. Also, even in a case wherein an initial state is smooth, there is a possibility that the rattling might occur by a change with age.

An object of the present invention is to solve the aforementioned problems, and not only to excel in an air flow direction regulation, but also to excellently maintain a built-in operability of fins even with many numbers into the housing together with a shaft support member without dividing the housing.

Means for Solving the Problems

In order to obtain the aforementioned objects, the present invention is an air flow direction regulation device comprising a plurality of fins turnably supported; an approximately cylindrical housing arranging an operation portion or a gear mechanism for allowing a direction of each fin to be regulated; and a case disposing the housing internally, and each fin is turnably supported as support points by an outer pivot portion on a housing inner circumferential side and an inner pivot portion on a housing center axis line side, and includes a gear portion provided near the inner pivot portion. Also, the gear mechanism includes a gear integrally rotating with the operation portion through a shaft to engage the gear portion of each fin. Also, the housing includes a flexible shaft support member provided on a housing center axis line, and forming a connection portion fitting into the inner pivot portion of each fin, and a through hole inserting the flexible to pass through in a skewered manner.

In the aforementioned present invention, it is sufficient that the "fin" is turnable as the support points by the outer pivot portion on the housing inner circumferential side and the inner pivot portion on the housing center axis line side, namely, as a support point of a pivot line in a radial direction. The fins are formed with two or more. Also, the "flexible shaft support member" represents a structure in which the shaft support member is more flexible or softer than the fin, the shaft, and the operation portion, and as a material, the shaft support member is not limited to a flexible resin molded member, and may be a rubber molded member and the like. The "fitting" represents a relationship of rotating each other or turnably fitting.

The aforementioned present invention may be embodied with the following aspects.

(1) In a structure, an outer circumferential face of the housing is formed in an approximately convex spherical face, and includes a plurality of projections provided to project at portions equally dividing a circumference of the convex spherical face, and an inner circumferential face of the case is partially formed in an approximately concave spherical face corresponding to the convex spherical face, and includes flexible spacers defining and forming concave portions provided to correspond to the projections, and concaved grooves arranged in the concave portions and slidingly fitting into the projection, and in a state wherein the projection fits into the grooves of the spacer, the housing is regulated to tilt to top and bottom, and right and left relative to the case. Incidentally, the "flexible spacer" represents a structure in which the spacer is more flexible or softer than the case, and the material is not limited to the flexible resin molded member, and may be the rubber molded member and the like. According to the aspect, an abutment load of the projection can be easily uniformed, or a deviation in the abutment load is reduced so as to carry out a smooth tiling regulation operation and to improve a tilting operation characteristic. Obviously, the flexible spacer is attached to the case subsequently, so that comparing with a case wherein the case itself is made flexible, securing rigidity becomes easy so as to maintain an excellent quality.

(2) In the structure, the connection portion of the shaft support member is a shaft portion, and the inner pivot portion of the fin is formed by a cylinder portion fittable into the shaft portion, and forming the gear portion at a circumference. According to the aspect, the gear portion can be easily formed accurately. Also, the fitting between the shaft portion which is the connection portion of the shaft support member and the cylinder portion is simplified.

(3) In the structure, on end faces of the operation portion and the shaft support member, there are provided a convex portion provided on one side, and a plurality of engagement portions provided on the other side to engage with and disengage from the convex portion, and by a rotation of the operation portion, the engagement portions engaging the convex portion are switched to vary a direction of the fin. According to the aspect, a moderate feeling or click feeling at a time of a rotation operation can be obtained, thereby, providing an excellent rotational operability and a feeling of a high grade.

(4) In the structure, the engagement portions include a first engagement portion engaging the convex portion when each fin is disposed almost parallel to the housing center axis line; a second engagement portion engaging the convex portion when each fin is disposed almost obliquely; and a third engagement portion engaging the convex portion when each fin is disposed to be almost right-angled. There, three respective engagement portions are formed, and by switching the engagement portions engaging the convex portion in sequence by rotating the operation portion, each fin can be switched between a usual ventilation state and a diffusion ventilation state, and moreover, between the diffusion ventilation state and a closed state so as to obtain a simplified operation. According to the aspect, in the aforementioned aspect in (3), each fin is switched to the usual ventilation state, the diffusion ventilation state, and the closed state in sequence, or conversely, is switched to the closed state, the diffusion ventilation state, and the usual ventilation state in sequence so as to simplify the switching of a selection of a ventilation state.

(5) In the structure, there is included an urging member urging the shaft support member to the operation portion side. According to the aspect, by the urging member urging the shaft support member to the operation portion side, a gap between the operation portion and the shaft support member is eliminated so as to remove wobbling, or by selecting a member having a most optimal urging force as the urging member, a rotational force or an abutment of the operation portion can be easily optimized.

(6) In the structure, the concave portions and the spacers are provided at four portions approximately equally dividing a circumference, and groove widths of the concaved grooves are formed by two different types of the groove widths. According to the aspect, in the housing in which the fins and the like are built in, four projections slide along the corresponding grooves of the flexible spacers on a case inner circumferential face so as to switch to an initial posture state, an up-and-down swinging state, and a right-and-left swinging state. In that case, each spacer is formed by a concave shape having a narrow groove width which fits into the projection, and a concave shape having a wide groove width which loosely fits into the projection so as to obtain various tilting states which correspond to a wide groove width.

(7) In the structure, the case is divided into a front case and a back case, and the concave portions and the spacers are disposed across the front and back cases. As described in the aspect in (1), in case the housing outer circumferential face has the convex spherical face, and the case inner circumferential face has the concave spherical face corresponding to the convex spherical face thereof, the housing cannot be incorporated into the case unless the case is divided into the front and back. According to the aspect (8), in a case wherein the case is divided into the front and back, when the concave portions and the spacers are disposed across the front and back cases, a step at a boundary is eliminated by the spacer so as to maintain an excellent operation.

Effect of the Invention

In the present invention, an assembly operability of each fin and the shaft support member into the housing can be improved, and after an assembly, the wobbling can be suppressed, or unexpected coming off can be prevented. Namely, the fins and the shaft support member are assembled into the housing in a fitting state between the connection portion and an inner shaft support portion. At that time, the shaft support member bends by the presence of the through hole so as to be comparatively easily incorporated into the housing. Thereafter, the shaft support member becomes difficult to bend when the shaft is inserted to pass through the through hole so as to suppress the wobbling of each fin and to become difficult to come off.

BRIEF DESCRIPTION OF THE DRAWINGS

FIGS. 1(a) to 1(c) show an air flow direction regulation device of an embodiment of the present invention in a usual ventilation state of fins, wherein FIG. 1(a) is a front view; FIG. 1(b) is a cross-sectional view taken along a line A-A in FIG. 1(a); and FIG. 1(c) is a cross-sectional view taken along a line B-B in FIG. 1(a).

FIGS. 2(a) and 2(b) show the air flow direction regulation device in a diffusion ventilation state of the fins, wherein FIG. 2(a) is a front view; and FIG. 2(b) is a side view.

FIGS. 3(a) to 3(c) show the air flow direction regulation device in a closed state of the fins, wherein FIG. 3(a) is a front view; FIG. 3(b) is a cross-sectional view taken along a line A1-A1 in FIG. 3(a); and FIG. 3(c) is a cross-sectional view taken along a line B1-B1 in FIG. 3(a).

FIGS. 5(a) and 5(b) show a structure of the housing in which the fins and the like are built in, wherein FIG. 5(a) is an exploded view showing a relationship among the fins and a shaft support member, and a gear and the like; and FIG. 5(b) is an exploded view showing a relationship between the housing and the fins and the like.

FIGS. 7(a) to 7(c) show a condition when the housing in which the fins and the like are built is tilt relative to the case, wherein FIG. 7(a) shows an initial posture state of the housing; FIG. 7(b) shows an up-and-down swinging state of the housing; and FIG. 7(c) is an operation explanatory view showing a right-and-left swinging state of the housing.

FIGS. 8(a) to 8(c) show the air flow direction regulation device in the usual ventilation state wherein the case is omitted, wherein FIG. 8(a) is a perspective view thereof; FIG. 8(b) is a perspective view in which the housing is omitted; and FIG. 8(c) is a side view in which the housing is omitted.

FIGS. 9(a) to 9(c) show the air flow direction regulation device in the diffusion ventilation state wherein the case is omitted, wherein FIG. 9(a) is a perspective view thereof; FIG. 9(b) is a perspective view in which the housing is omitted; and FIG. 9(c) is a side view wherein the housing is omitted.

FIGS. 10(a) to 10(c) show the air flow direction regulation device in the closed state wherein the case is omitted, wherein FIG. 10(a) is a perspective view thereof; FIG. 10(b) is a perspective view in which the housing is omitted; and FIG. 10(c) is a side view wherein the housing is omitted.

BEST MODES OF CARRYING OUT THE INVENTION

Figure 1A:
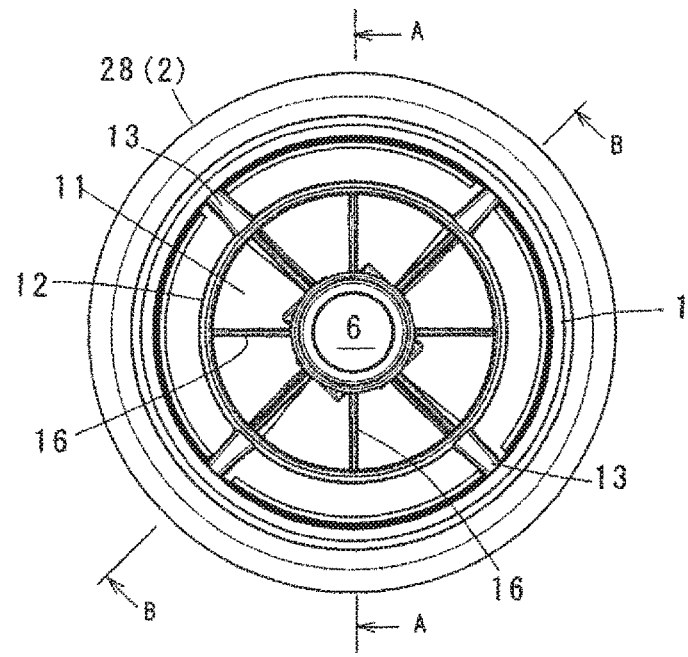

Hereinafter, one embodiment of the present invention will be explained with reference to the attached drawings. In the explanation, after a structure and an assembly procedure of an air flow direction regulation device are clarified, main operations will be described.

(Structure) As shown in FIG. 1(a) to FIG. 5(b), the air flow direction regulation device of the embodiment comprises an approximately cylindrical housing 1 internally arranging a plurality of (in this example, four) fins 4 turnably supported, an operation knob 6 and gear mechanisms 46 and 50, which are operation portions for allowing a direction of each fin 4 to be regulated; and a flexible shaft support member 7 and the like; a case 2 disposing the housing 1 in an inside space divided by a back case 20, a front case 25, and a decorative frame 28 for allowing the housing 1 to be tilting-regulatable; and flexible spacers 3A and 3B provided across each inner circumferential face of the front case 25 and the back case 20, and forming concave grooves 31 fitting or loosely fitting into projections 17 on a housing outer circumferential face.

Each of the members will be outlined. Each of the fins 4 is turnably supported as support points by a shaft portion 44 which is an outer pivot portion provided on an outer circumferential side, and a cylinder portion 45 which is an inner pivot portion provided on an inner circumferential side, and includes a gear portion 46 provided in a circumference portion of the cylinder portion 45. The gear mechanism includes the gear portion 46, and the gear 50 provided at a tip of a shaft 5 to be connected to the operation knob 6, and engaged with the gear portion 46 of each fin. The shaft support member 7 is held on a center axis line N of the housing, and forms a shaft portion 73 which is a connection portion to fit into the cylinder portion 45 of each fin; a through hole 71 to turnably insert the shaft 5 to pass through in a skewered manner; and the like. Also, there is included an urging member 8 provided between the shaft support member 7 and the gear 50 in a state supported around an axis of the shaft 5. Hereinafter, details of the aforementioned members will be clarified.

First, regarding a material of each member, all of the housing 1, the front and back cases 25 and 20 and the decorative frame 28 forming the case 2, the spacers 3A and 3B, each fin 4, the shaft 5 with the gear 50, the operation knob 6, and the shaft support member 7 may be a resin molded member. Among those, the spacers 3A and 3B and the shaft support member 7 may be a flexible resin molded member, and are more flexible or softer than other members (a rigid-type resin molded member). The urging member 8 may be made of metal.

Figure 1B:
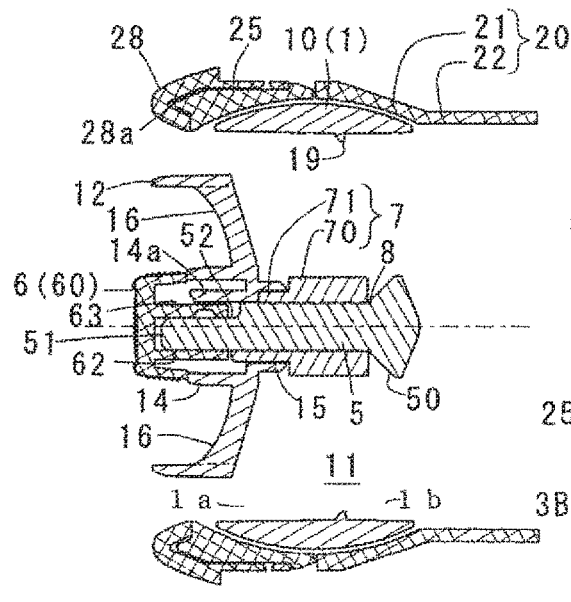
Figure 4:
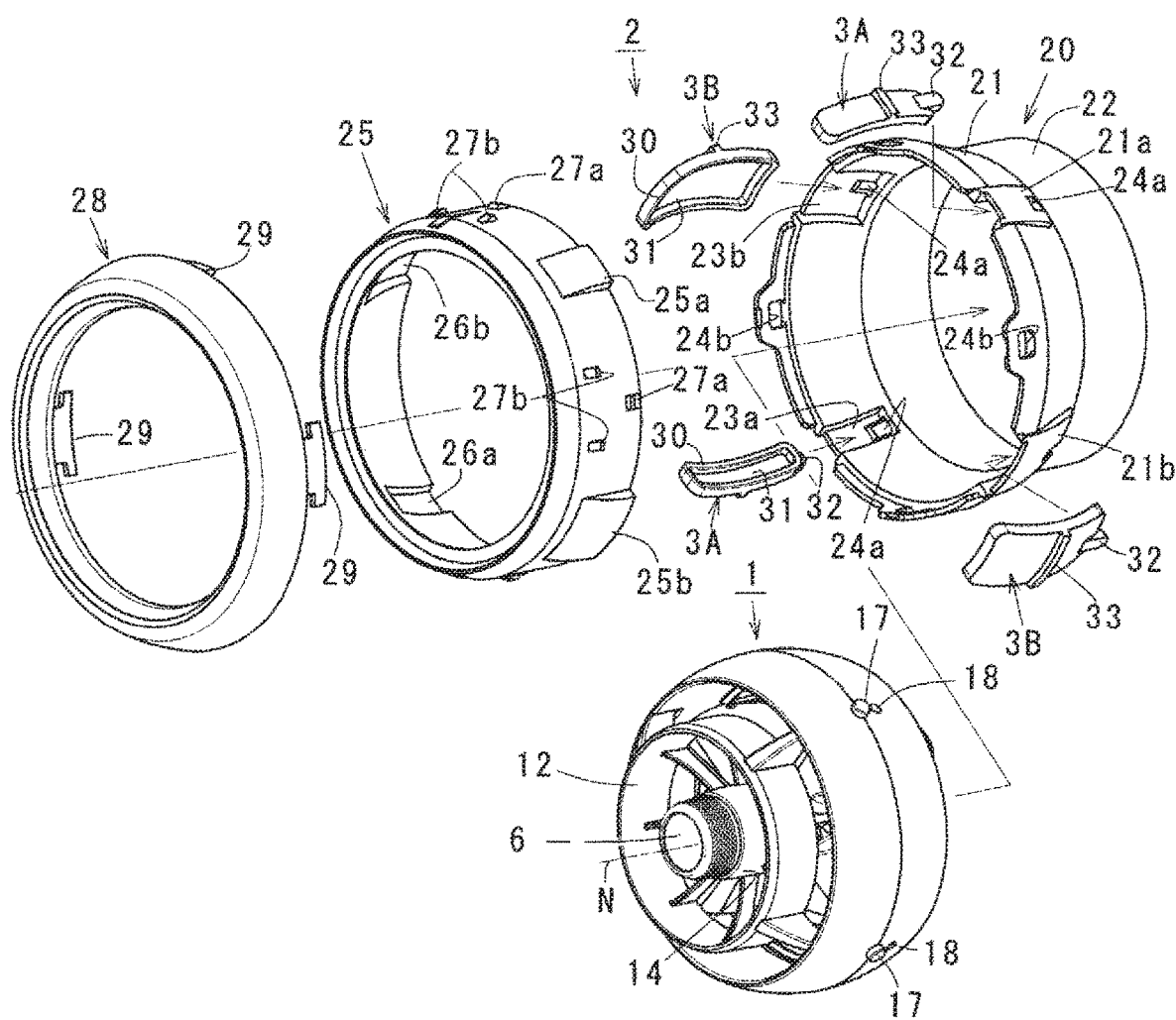
FIG. 4 is a schematic exploded view showing a relationship between a housing in which the fins and the like are built in, and the case forming the air flow direction regulation device.
Figure 5A:
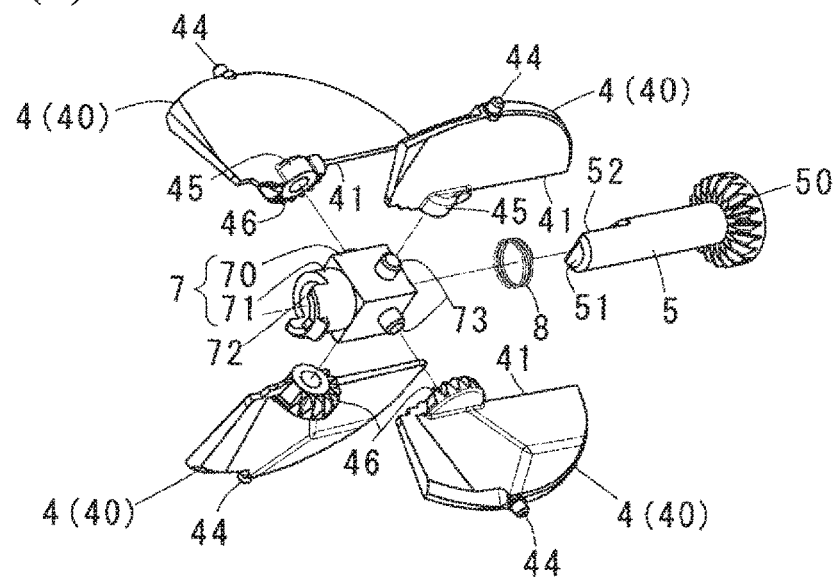
Figure 5B:
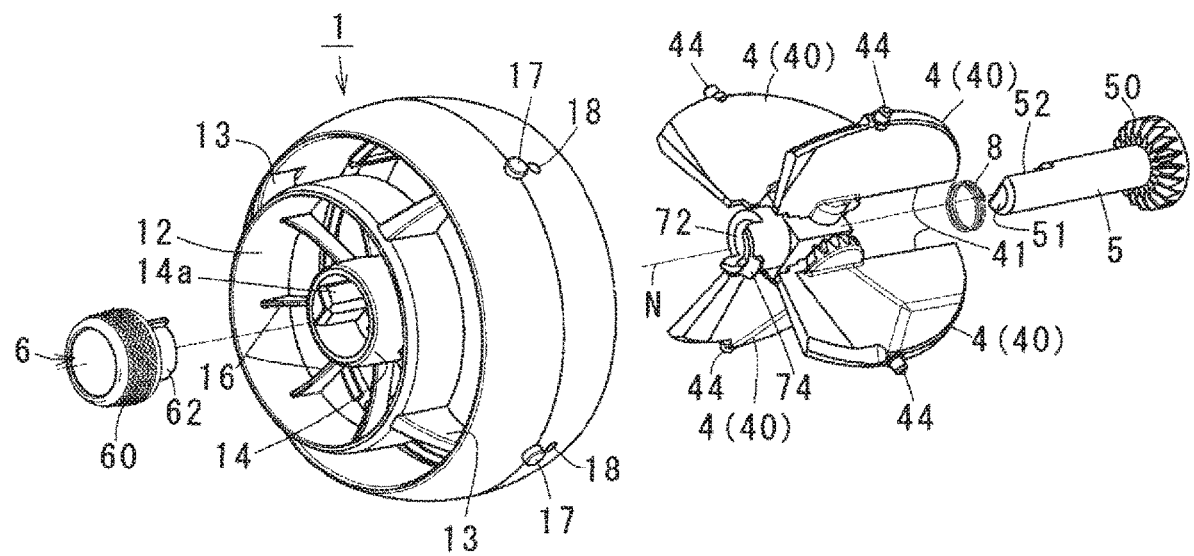

As shown in FIG. 1(b), FIG. 4, and FIG. 5(b), the housing 1 is set such that an inner front end side thereof is an air outlet 1a, and an inner back end side thereof is an air inlet 1b. Also, an outer circumference thereof has an approximately convex spherical face, and an inner circumference thereof has an approximately concave spherical face turnable at a support point of the housing center axis line N which is common with each fin 4. In the housing 1, there are provided four columnar projections 17 located on a housing outer circumference, and projecting at portions equally dividing a circumference thereof at an approximately middle of the front and back, which is enlarged; and shaft holes 18 which are the outer pivot portion passing through at portions equally dividing a circumference thereon on a back side of the projections 17. Inside the housing, there are provided a cylindrical shaft support portion 14 disposed at a front-side center portion; a cylindrical shaft support portion 15 integrated with a back end face side of the shaft support portion 14 and having a diameter one size smaller than the shaft support portion 14; lattice portions 12, 13, and 16 interposed between the shaft support portion 14 and a housing inner circumferential face; and a control projection 19 (see FIG. 1(b) and FIG. 3(b)) protruding on a back-side inner circumferential face and controlling a turning range of the fin 4.

Figure 1C:
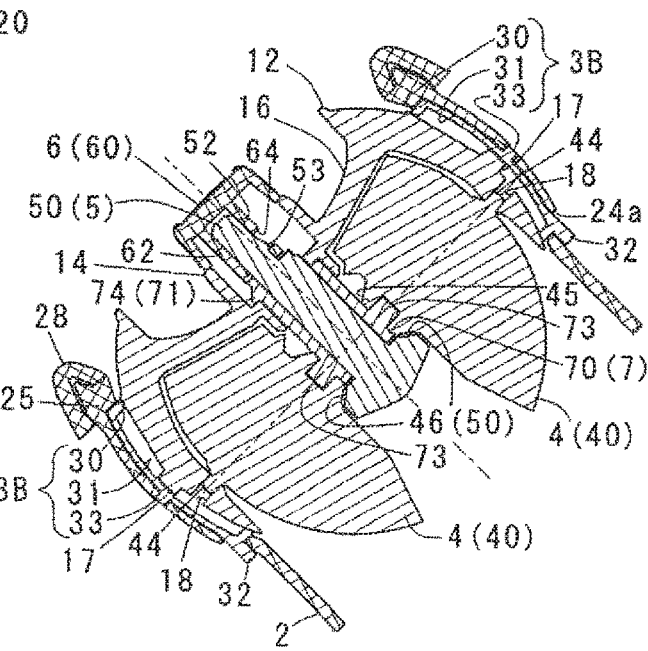
Figure 2A:
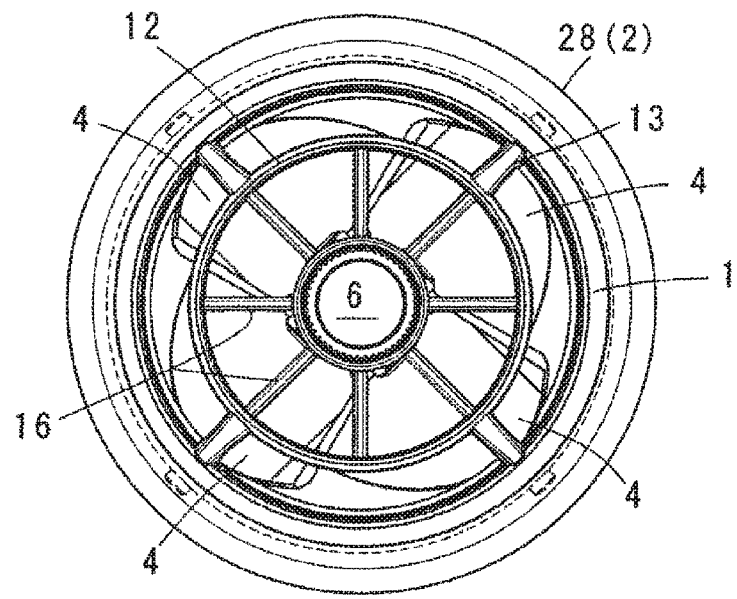
Figure 2B:
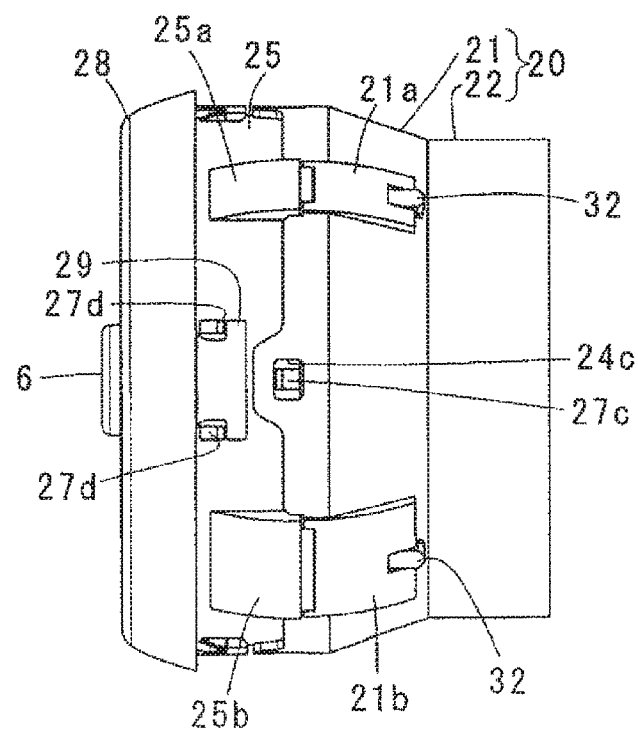
Figure 3A:
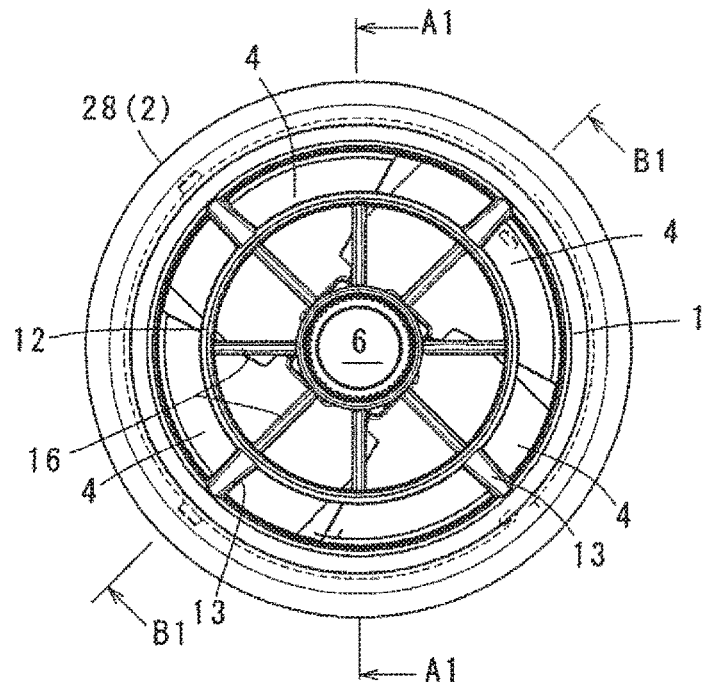
Figure 3B:
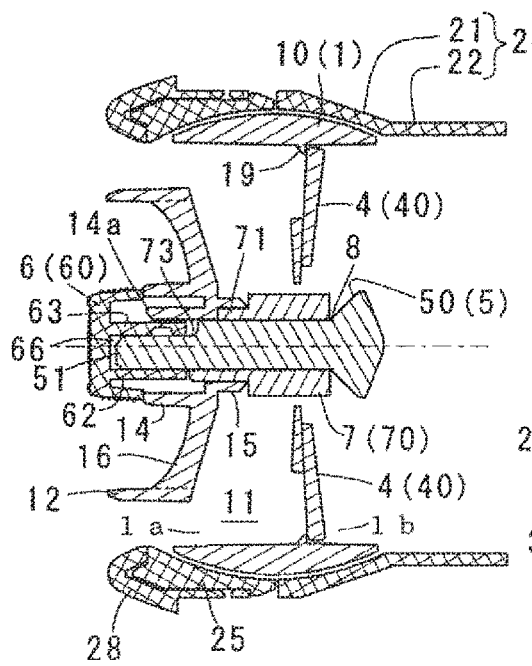
Figure 3C:
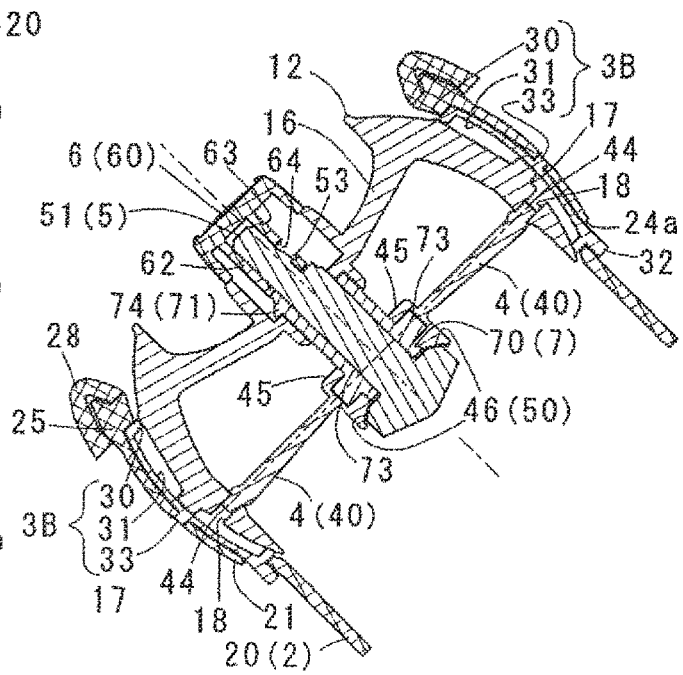

The shaft support portion 14 has an approximately cylinder shape into which a cylinder portion 62 of the operation knob 6 is inserted. As shown in FIGS. 1(b) and 1(c), the shaft support portion 15 turnably holds the shaft support member 7 in a state wherein a cylinder portion 71 of the shaft support member is inserted into the cylinder so as to be retained. The lattice portion 12 has a ring shape which is one size larger than the cylinder shape of the shaft support portion 14, and is supported by a plurality of rod-like lattice portions 13 provided between the lattice portion 12 and the inner circumferential face of the housing 1. The shaft support portion 14 is supported by a plurality of rod-like lattice portions 16 provided between the shaft support portion 14 and an inner circumferential face of the lattice portion 12. Inside the cylinder of the shaft support portion 14, there is provided an inner wall 14a having an approximately triangle shape in cross section for eliminating a gap provided to correspond to a shape of the cylinder portion 62 of the later-described operation knob 6.

As shown in FIG. 1(a) to FIG. 3(c), and FIG. 4, in the case 2, the front case 25 is connected to the back case 20, and the decorative frame 28 is connected to the front case 25. Among those, in the back case 20, a back side thereof has a circular cylinder portion 22, and a front side thereof has a spherical cylinder portion 21 to be connected to the front case 25. The spherical cylinder portion 21 includes concave portions 23a and 23b provided respectively as a pair at portions equally dividing a circumference on an inner circumferential face thereof; locking holes 24a provided in the respective concave portions 23a and 23b for attaching the corresponding spacers 3A and 3B; locking holes 24b provided in four tongue pieces projecting at portions equally dividing the circumference on an end face; and projecting portions 21a and 21b provided to correspond to the respective concave portions 23a and 23b. Both the concave portions 23a and both the concave portions 23b face each other, respectively. The concave portion 23a and the projecting portion 21a have a width smaller than that of the concave portion 23b and the projecting portion 21b.

The front case 25 has a spherical shape corresponding to the cylinder portion 21, and includes concave portions 26a and 26b provided respectively as a pair at portions equally dividing a circumference on an inner circumferential face thereof; and projecting portions 25a and 25b provided to correspond to the respective concave portions 26a and 26b. Both the concave portions 26a and both the concave portions 26b face each other, respectively. The concave portion 26a and the projecting portion 25a have a width smaller than that of the concave portion 26b and the projecting portion 25b. Also, on an outer circumference, there are included a pair of locking convex portions 27b provided between the projecting portion 25a and the projecting portion 25b; and engagement convex portions 27a provided to project between respective two locking convex portions 27b so as to engage the locking holes 24b of the back case. Each of the concave portions 26a and 26b connects to each of the corresponding concave portions 23a and 23b of the back case 20 in a state wherein the front and back cases 25 and 20 are connected by an engagement between each engagement convex portion 27a and each locking hole 24b.

The decorative frame 28 includes an approximately V-shaped receiving portion 28a provided on a front inner side as shown in FIG. 1(b); and a total of four approximately inverted T-shaped connection pieces 29 provided to project at portions equally dividing a circumference on a back end face thereof as shown in FIG. 4. Then, in the decorative frame 28, each connection piece 29 engages between the respective two locking convex portions 27b so as to be attached relative to the front case 25 in a state of covering a front end side of the front case. This attachment operation may be carried out either before or after the front case 25 connects to the back case 20.

The spacers 3A and 3B may be formed by the flexible resin molded member. The spacer 3A is formed to have a size corresponding to the concave portion 23a and the concave portion 26a, and the spacer 3b is formed to have a size corresponding to the concave portion 23b and the concave portion 26b, respectively. In each of the spacers 3A and 3B, there is used a plate piece curving corresponding to an inner face of the cylinder portion 21 and the front case 25, and in a state wherein a circumference wall 30 is provided on an inner face of the plate piece, there is defined and formed a concaved groove 31. The groove 31 of the spacer 3A has a groove width into which the projection 17 slidingly fits in a groove direction. On the other hand, the groove 31 of the spacer 3B has a width wider than that of the spacer 3A, and a groove width into which the projection 17 slidingly loosely fits in the groove direction and a groove width direction. Also, the spacers 3A and 3B include small projections 32 provided to project at a middle on one end side, and ribs 33 provided to project at an approximately middle on an outer face.

Figure 10A:
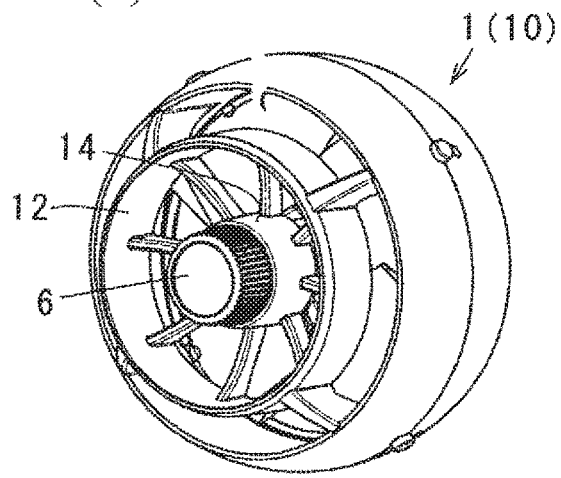
Figure 10B:
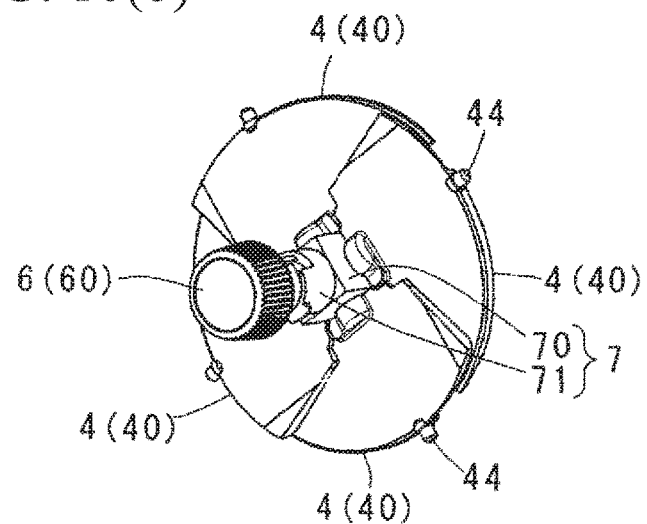
Figure 10C:
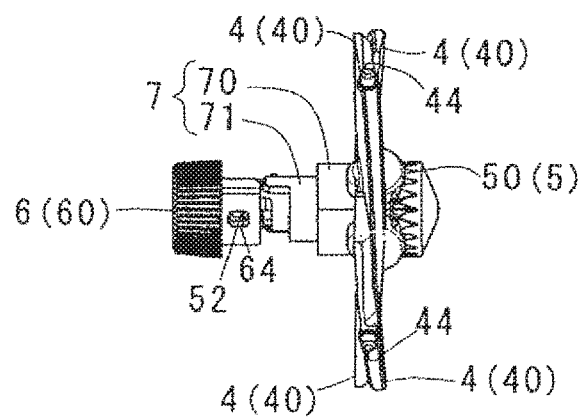
Figure 11A:
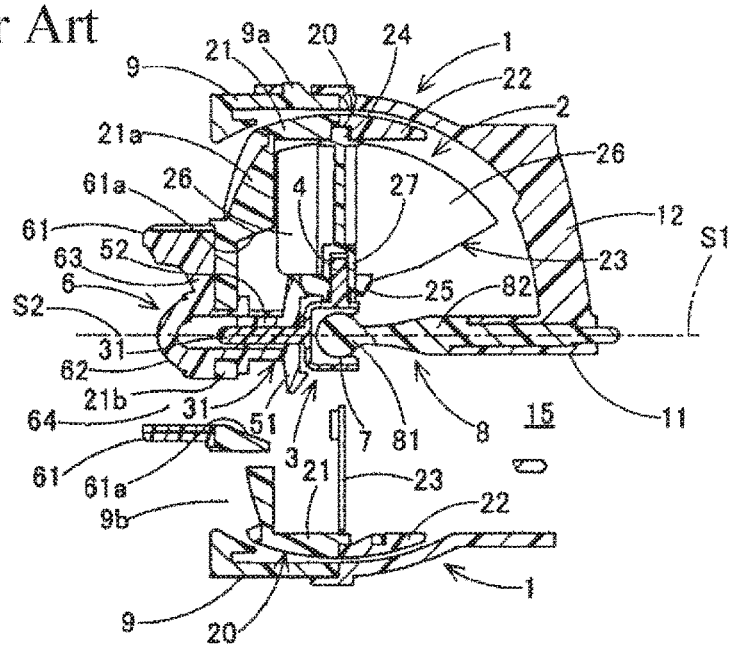
FIGS. 11(a) and 11(b) show a device structure disclosed in Patent Document 1 (FIG. 4 and FIG. 7 of the same Document 1).
Figure 11B:
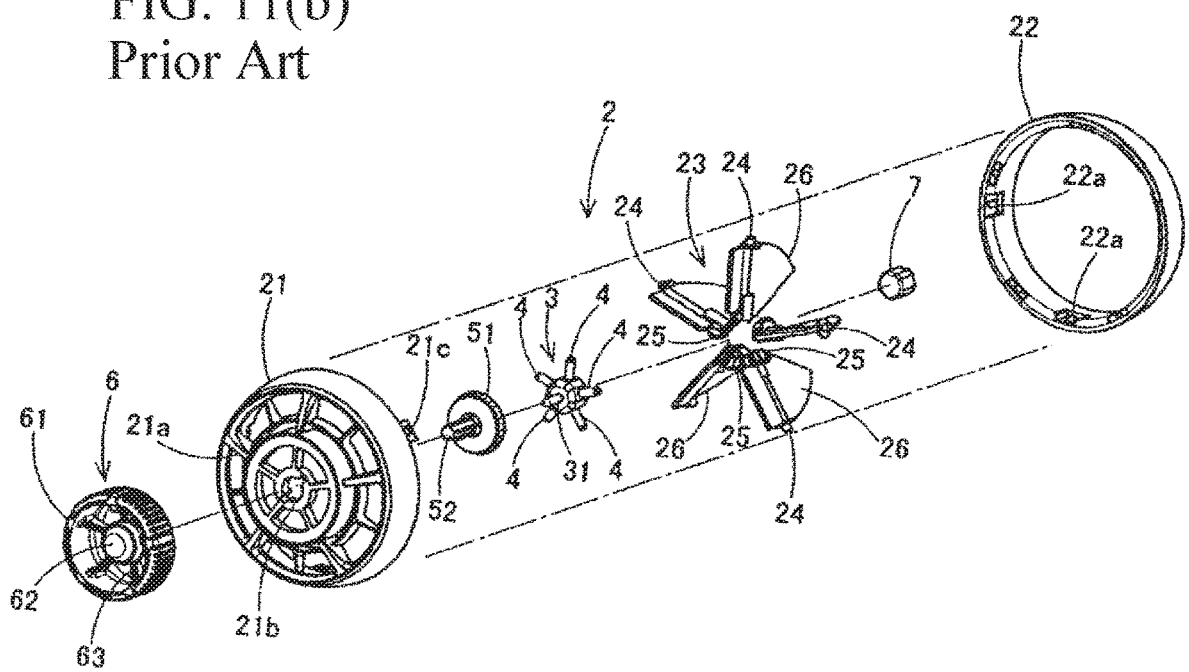
Figure 12A:
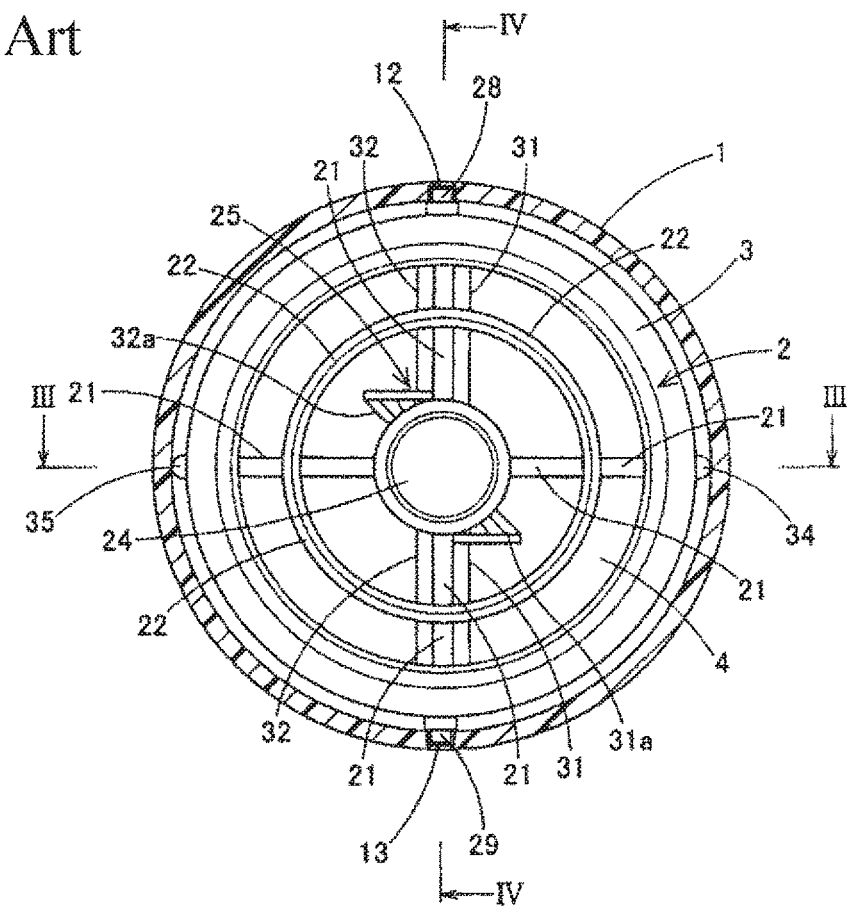
FIGS. 12(a) and 12(b) show a device structure disclosed in Patent Document 2 (FIG. 1 and FIG. 3 of the same Document 2).
Figure 12B:
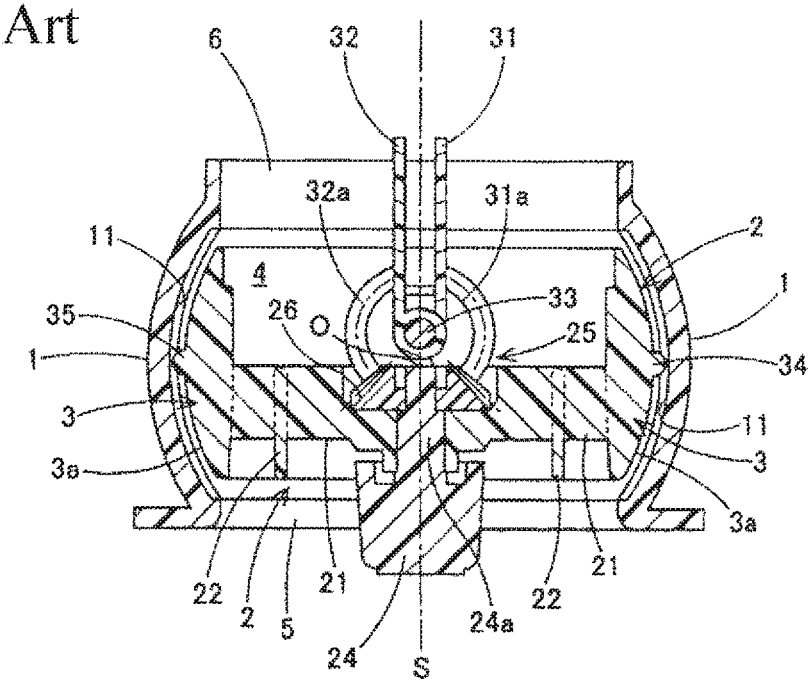

Next, an internal structure of the housing 1 will be clarified. As shown in FIGS. 5(*a*) and 5(*b*), and FIGS. 10(*a*) to 10(*c*), in each fin 4 disposed inside the housing 1, an outer circumferential face 40 is formed in an approximately arc shape corresponding to an inner circumferential face of the housing 1, an inner circumferential face 41 is formed approximately in a straight line, and when the fin 4 is disposed to be almost right-angled relative to the housing center axis line N, the fin 4 has a shape which allows the housing 1 to come to a closed state by the four fins 4. Also, on the outer circumferential face 40, there is provided the columnar projection 44 fitting into the shaft hole 18. On the inner circumferential face 41, there is provided the cylinder portion 45, and there is formed the gear portion 46 on a circumference of the cylinder portion (in this example, an approximately semicircle of the cylinder portion). Then, in a state wherein the shaft portion 44 fits into the shaft hole 18 of the housing 1, and the cylinder portion 45 fits into the shaft portion 73 of the shaft support member 7 disposed on the housing center axis line N, each fin 4 is supported turnably.

Figure 6A:
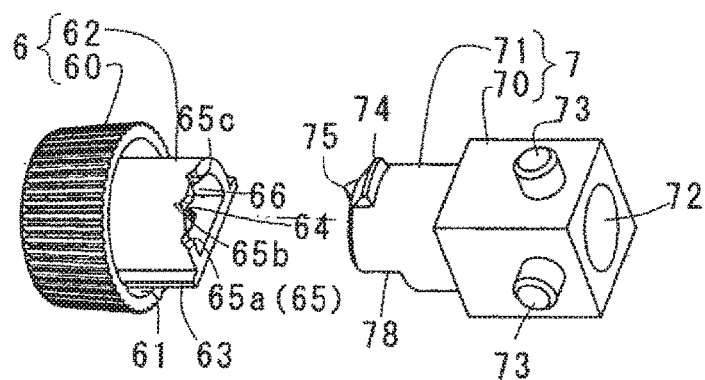
FIG. 6(a) is an exploded view showing a relationship between the shaft support member and an operation knob forming the air flow direction regulation device.
Figure 6B:
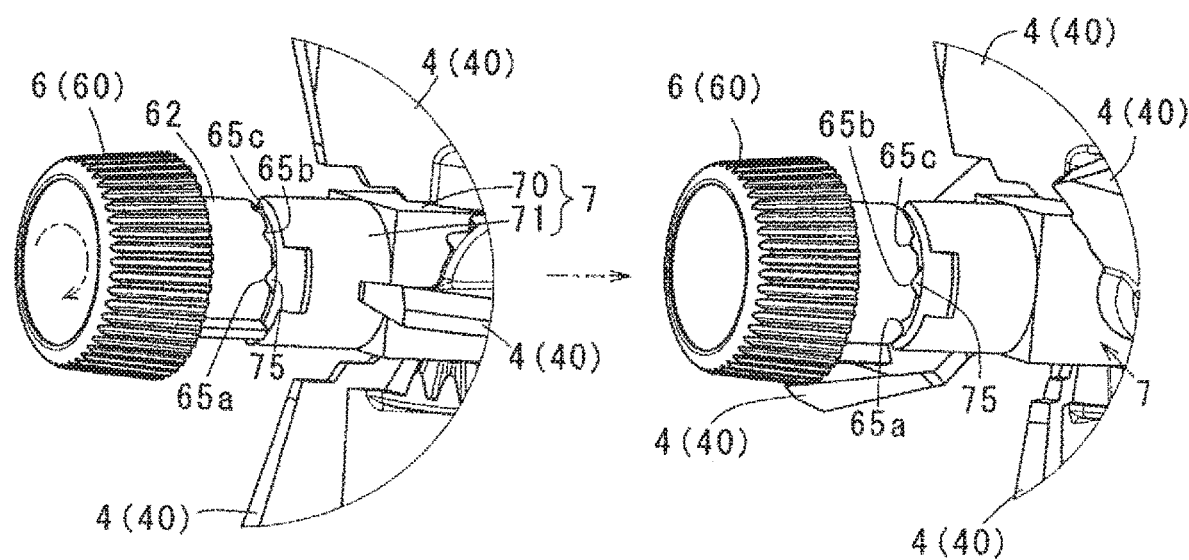
FIG. 6(b) is a structural view showing a state before and after a fin state is switched by rotating the operation knob.

As shown in FIGS. 1(*b*) and 1(*c*), FIGS. 5(*a*) and 5(*b*), and FIGS. 6(*a*) to 6(*c*), the shaft support member 7 is formed by a main member 70 which is a cube or a hexahedron; and a cylindrical cylinder portion 71 provided to project on one face of the main member 70. In the main member 70, there are included a through hole 72 provided in such a way so as to continue to an inner hole of the cylinder portion 71; and the shaft portions 73 provided to project on four faces of the top and bottom, and front and back. The cylinder portion 71 has a size wherein an outer diameter fits and is held in a cylinder shape of the shaft support portion 15 of the aforementioned housing, and includes a semicircular notch portion 78 provided on a projecting end side; a projection 74 provided to project on a projecting end outer circumference; and a convex portion 75 provided to project on a projecting end face.

As shown in FIGS. 5(*a*) and 5(*b*), the gear 50 forming the gear mechanism engages the gear portion 46 of each fin. The gear 50 is provided at the tip of the shaft 5 which is inserted to pass through the through hole 72 of the shaft support member turnably, i.e. in a skewered state. The shaft 5 is formed such that a back end 51 side has a semicircular shape in cross section with a prescribed length or a semi-cylindrical shape, and as shown in FIG. 1(*c*), the shaft 5 includes a claw portion 53 provided to project on a flat plate portion 52 having the semi-cylindrical shape. Then, in the shaft 5, the back end 51 side is connected to the operation knob 6 through the claw portion 53. Incidentally, the aforementioned gear 50 and gear portion 46 are appropriately provided such that they have a relationship to transmit a rotational movement between two intersecting shafts. Usually, there are formed by a bevel gear such as a Miter gear, a spiral bevel gear, a helical gear, and the like.

As shown in FIGS. 1(*b*) and 1(*c*), and FIGS. 6(*a*) and 6(*b*), the operation knob 6 is formed by a pinching portion 60 gripped with a hand, and the cylinder portion 62 provided to project from an inside of the pinching portion 60. The pinching portion 60 has a cylinder shape with a bottom, and turnably abuts against a projecting end of the shaft support portion 14. The cylinder portion 62 includes an inside portion 66 having an approximately semicircular shape in cross section, and a flat plate portion 63 having a semi-cylindrical shape. On the flat plate portion 63, there is provided a locking hole 64 (see FIG. 1(*c*) and FIG. 3(*c*)) with which the claw portion 53 of the shaft engages. Also, in the cylinder portion 62, a projecting end face except for the flat plate portion 63 has an arc end face, and in the arc end face, there are provided engagement portions 65*a* to 65*c*.

The respective engagement portions 65*a* to 65*c* form a click device when the operation knob 6 rotates together with the convex portion 75 on a shaft side so as to obtain a moderate feeling or click feeling. In that example, there are included the first engagement portion 65*a* engaging the convex portion 75 when each fin 4 is disposed almost parallel to the housing center axis line N; the second engagement portion 65*b* engaging the convex portion 75 when each fin 4 is disposed almost obliquely; and the third engagement portion 65*c* engaging the convex portion 75 when each fin 4 is disposed to be almost right-angled.

(Assembly) Hereinafter, one example of the assembly procedure of the aforementioned respective members will be explained. In that example, after assembled relative to the housing 1 in a state wherein each fin 4 is held in the shaft support member 7, the shaft 5 and the operation knob 6 are incorporated. After that, the housing 1 is operated to be held in the case 2. Details thereof will be described as follows.

First, each fin 4 is held relative to the shaft support member 7 in a state wherein the cylinder portion 45 fits into the shaft portion 73. Then, the shaft support member 7 is incorporated inside the housing 1 in a state including the fin 4. In that case, when the shaft support member 7 with the fin is attempted to be pushed into the housing 1 in a state shown in FIG. 5(*b*), each shaft portion 44 abuts against a housing back end halfway. Thereat, each shaft portion 44 is pressed into a main member 70 side, and is pressed into a housing inner circumference accompanied by a displacement in a diameter reduction of the main member 70 to a through hole 72 side, and furthermore fits into the corresponding shaft hole 18. In that process, as shown in FIGS. 1(*b*) and 1(*c*), the cylinder portion is inserted into a cylinder inside of the shaft support portion 15, and while reducing a diameter of the projection 74, protrudes to a cylinder outside from the cylinder inside of the shaft support portion 15, i.e. to a cylinder inside of the shaft support portion 14 so as to return to an original state. Thereby, the shaft support member 7 is held in a state retained relative to the shaft support portion 14 by the projection 74 of the cylinder portion. Each fin 4 is located inside the housing 1, and is held turnably as support portions of the shaft portion 44 and the shaft portion 73.

In the aforementioned shaft 5 and operation knob 6, after the shaft support member 7 with the aforementioned fin is incorporated relative to the housing 1, the shaft 5 is inserted into the through hole 72 of the shaft support member from a back side of the housing 1 in the skewered manner, and the cylinder portion 62 of the operation knob is inserted into the cylinder shape of the shaft support portion 14 from a front side of the housing 1. At that time, a coil spring which is the urging member 8 is disposed around the axis of the shaft 5. The urging member 8 is disposed in a compressional state between the gear 50 and the main member 70 of the shaft support member in a state held in the shaft 5. Thereby, the urging member 8 urges the shaft support member 7 to an operation knob 6 side in a state wherein the shaft 5 is engaged and connected to the locking hole 64 of the operation knob. Consequently, in that structure, the operation knob 6 is operated to rotate, and for example, when the engagement portion 65*a* engaging the convex portion 75 is disengaged and switched to engage the next engagement portion 65*b*, or furthermore, when the engagement portion

65b is disengaged and switched to engage the next engagement portion 65c, the moderate feeling or click feeling can be provided.

Next, the housing 1 in which the aforementioned fins 4 and the like are built in is incorporated into the case 2. In that operation, the aforementioned spacers 3A and 3B are incorporated into the back case 20 and the front case 25. In the assembly procedure, after the spacers 3A and 3B are incorporated relative to the back case 20, the housing 1 is disposed inside the back case 20, and next, the front case 25 is connected to the back case 20. Namely, first, in the spacers 3A and 3B, each of the small projections 32 engages each of the locking holes 24a, and fits into each of the concave portions 23a and 23b of the back case 20. After that, the housing 1 is incorporated into the back case 20 in a state wherein fins 4 and the like are built in as described above.

At that time, each of the projections 17 of the housing fits or loosely fits into the corresponding groove 31 of the spacer 3A or 3B. Next, the front case 25 is connected relative to the back case 20 by engaging the small projection 27a with the corresponding locking hole 24b. Simultaneously, portions protruding from the concave portions 23a and 23b of each of the spacers 3A and 3B fit into the corresponding concave portions 26a and 26b of the front case 25. Thereby, the housing 1 in which the fins 4 and the like are built in is incorporated relative to the case 2 in a state wherein the projection 17 fits or loosely fits into the groove 31 of each spacer so as to be completed as the air flow direction regulation device shown in FIG. 1(*a*) to FIG. 3(*c*), and FIG. 7(*a*) to FIG. 7(*c*).

(Operation) Hereinafter, the main operations and advantages of the aforementioned air flow direction regulation device will be described.

(1) In the device assembly work, as mentioned above and as shown in FIGS. 5(*a*) and 5(*b*), the shaft support member 7 provided on the housing center axis line N is flexible, and easily bends by the presence of the through hole 72 for inserting the shaft to pass through so as to be easily incorporated into the housing 1 in a state wherein the shaft support member 7 includes the fins 4, namely, a state wherein the shaft support member 7 supports each fin 4 through fitting between the shaft portion 73 and the cylinder portion 45, thereby improving an assembly operability into the housing 1. Also, the shaft support member 7 becomes difficult to bend when the shaft 5 is inserted to pass through the through hole 72 so as to suppress a possibility of coming off unexpectedly or wobbling of each fin 4 as well.

Figure 7A:
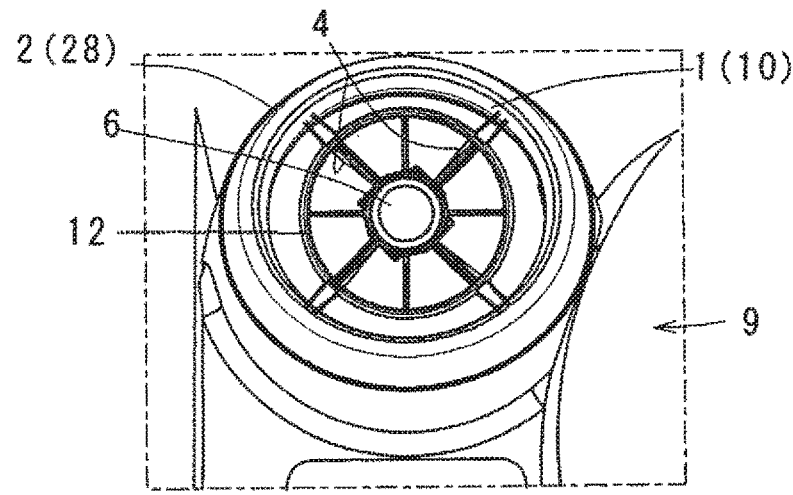
Figure 7B:
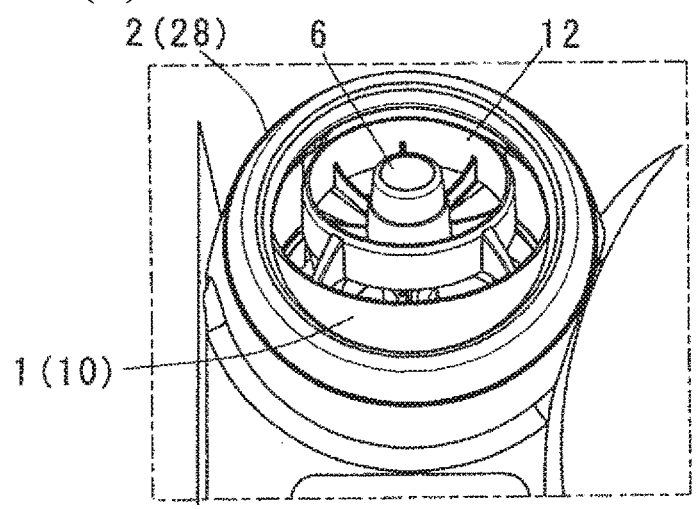
Figure 7C:
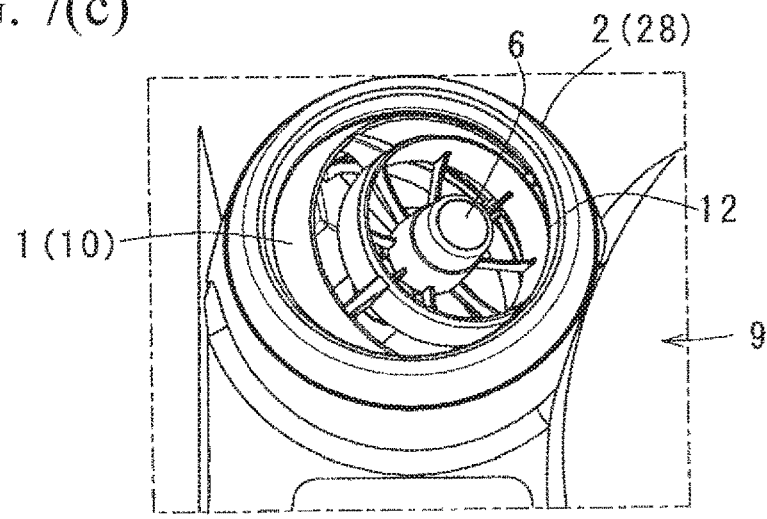

(2) As the first device characteristic, there are included the flexible spacers 3A and 3B arranged in the concave portions 23a and 26a and the concave portions 23b and 26b provided on an inner circumferential face of the case 2, and defining and forming the concave-shaped groove 31 which slidingly fits into the projection 17. Consequently, in that structure, as shown in FIGS. 7(*a*) to 7(*c*) as an example, in a state wherein the aforementioned air flow direction regulation device is equipped in an installation portion 9 of an auto body, when the housing 1 in which the fins 4 and the like are built in moves downwardly or upwardly relative to the case 2 from an initial posture state in FIG. 7(*a*) by pinching the operation knob 6, the housing 1 can be regulated to tilt in an up-and-down swinging state as shown in FIG. 7(*b*) as the example, or when the housing 1 in which the fins 4 and the like are built in moves to left or right by pinching the operation knob 6, the housing 1 can be regulated to tilt in a right-and-left swinging state as shown in FIG. 7(*c*) as the example. In the aforementioned tilting regulations, each of the projections 17 moves inside each of the grooves 31 of the flexible spaces 3A and 3B, and as a result, an abutment load of the projection 17 can be easily uniformed, or a deviation in the abutment load is reduced so as to carry out a smooth tiling regulation operation and to improve a tilting operation characteristic. Incidentally, in that structure, the flexible spacers 3A and 3B are attached to the case 2 subsequently, so that comparing with a case wherein the case itself is made flexible, securing rigidity becomes easy so as to maintain an excellent quality.

(3) As a second device characteristic, in the housing 1 in which each fin 4 is built in, the four projections 17 slide along the grooves 31 of the corresponding flexible spacers 3A and 3B on the case inner circumferential face so as to be switched to the initial posture state, the up-and-down swinging state, and the right-and-left swinging state as mentioned above. In that case, the grooves 31 of the respective spacers 3A and 3B are formed such that a groove width of the concave shape is narrow so as to fit into the projection; and the groove width of the concave shape is wide so as to loosely fit into the projection, so that various tilting states wherein the groove width corresponds to a wide portion are obtained. Furthermore, in case the outer circumferential face of the housing 1 has the convex spherical face, and the inner circumference face of the case 2 has the concave spherical face corresponding to the convex spherical face thereof, the housing 1 cannot be incorporated into the case 2 unless the case 2 is divided into the front and back. Thus, in a case wherein the case 2 is divided into the front and back, when the concave portions 23a and 26a, and the concave portions 23b and 26b, and the spacers 3A and 3B are disposed across the front and back cases 25 and 20, a step at a boundary is eliminated by the spacers 3A and 3B so as to reliably maintain an excellent operation.

(4) As a third device characteristic, each fin 4 includes the cylinder portion 45 as the inner pivot support, and the gear portion 46 is formed at the circumference portion of the cylinder portion 45 so as to easily form the gear portion 46 accurately as in the case of the embodiment. Also, the fitting between the shaft portion 73 of the shaft support member 7 and the cylinder portion 45 is simplified, and the flexible shaft portion 73 fits into the cylinder portion 45 so as to improve a turning characteristic of each fin 4.

Figure 8A:
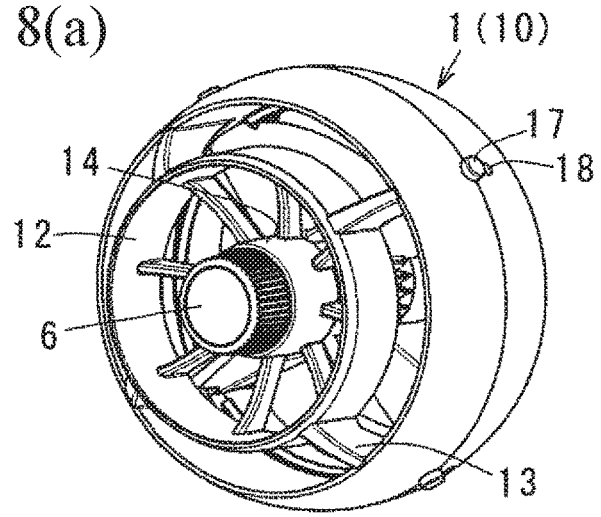
Figure 8B:
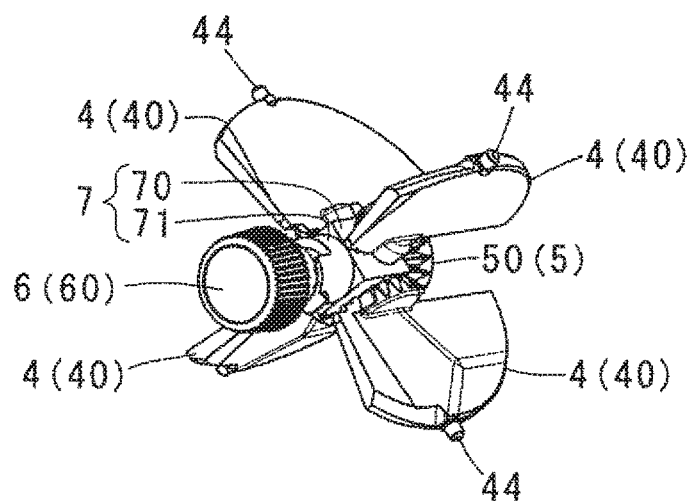
Figure 8C:
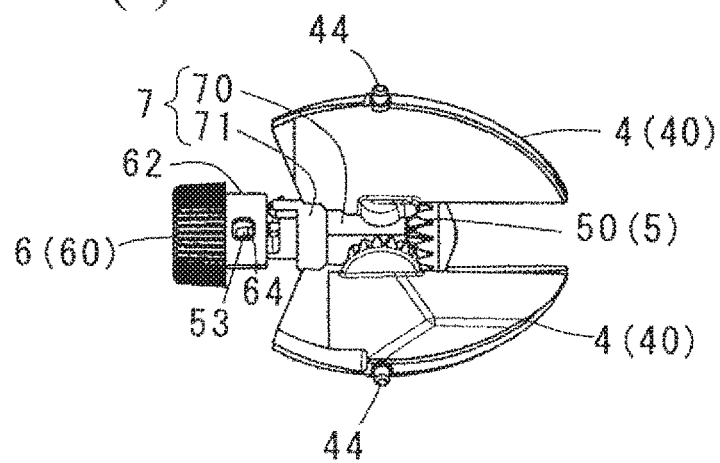
Figure 9A:
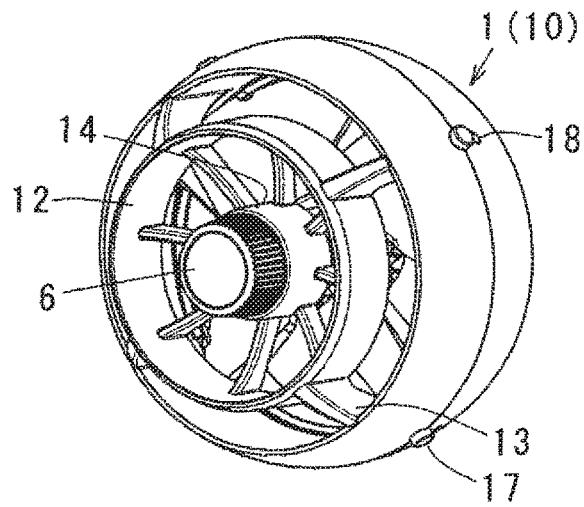
Figure 9B:
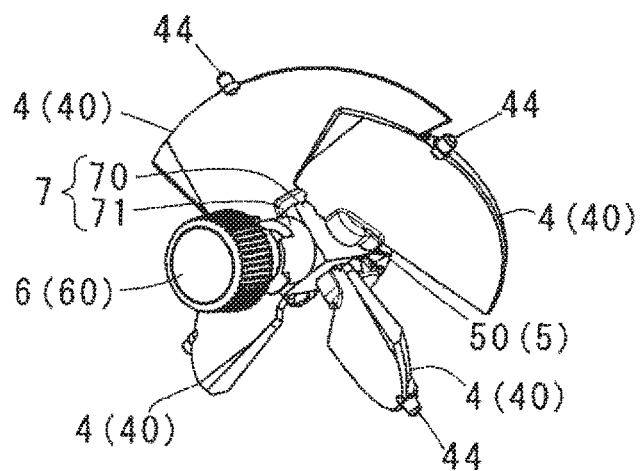
Figure 9C:
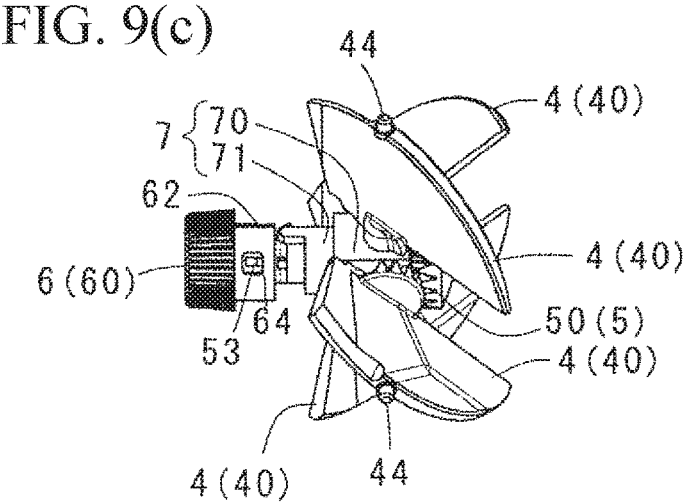

(5) As a fourth device characteristic, by a rotation operation of the operation knob 6, the engagement portions 65a to 65c engaging the convex portion 75 of the shaft support member are switched to vary a direction of each fin 4 so as to obtain the moderate feeling or click feeling at a time of the rotation operation, thereby, providing an excellent rotational operability and a feeling of a high grade. Namely, each fin 4 is switched to a usual ventilation state in FIGS. 1(*a*) to 1(*c*) and FIGS. 8(*a*) to 8(*c*); a diffusion ventilation state in FIGS. 2(*a*) and 2(*b*) and FIGS. 9(*a*) to 9(*c*); and a closed state in FIGS. 3(*a*) to 3(*c*) and FIGS. 10(*a*) to 10(*c*) in sequence, or conversely, is switched to the closed state, the diffusion ventilation state, and the usual ventilation state in sequence so as to simplify the switching of a selection of a ventilation state. The aforementioned three engagement portions 65a to 65c are formed as in the case of the embodiment, however, for example, six engagement portions may be formed so that the engagement portions engaging the concave portion 75 are switched in sequence by rotating the operation knob 6 so as to switch each fin 4 to more various states.

(6) As a fifth device characteristic, by the urging member 8 urging the shaft support member 7 to the operation knob 6, a gap between the operation knob 6 and the shaft support member 7 is eliminated so as to remove the wobbling, or by selecting a member having a most optimal urging force as the urging member 8, a rotational force or an abutment of the operation knob 6 can be easily optimized.

Incidentally, in the air flow direction regulation device of the present invention, details thereof can be modified or developed with reference to the aforementioned explanation provided that the invention has structures specified in the invention. As an example thereof, as the case, the decorative frame can be illuminated, or a decorative frame portion can be integrally formed in the front case. The urging member can be omitted, or an elastic portion which generates an urging force to facing portions between the shaft support member and a gear formation portion may be provided. The convex portion and the engagement portion form the click device, however, they may be illuminated to be simplified. Also, as the click device, the convex portion may be provided in the operation knob, and the engagement portion which engages with and disengages from the convex portion may be provided in the shaft support member. In the spacers, the groove width of each concaved groove is formed by two different types, however, it may be formed by a same groove width.

EXPLANATION OF SYMBOLS

1 . . . a housing (1*a* is an air outlet, and 1*b* is an air inlet.)
2 . . . a case (20 is a back case; 25 is a front case; and 28 is a decorative frame.)
3A and 3B . . . spacers (30 is circumference walls; 31 is grooves; and 32 is small projections.)
4 . . . fins (40 is outer circumferential faces, and 41 is inner circumferential faces.)
5 . . . a shaft (51 is a back end, and 53 is a claw portion.)
6 . . . an operation knob (an operation portion, and 60 is a pinching portion.)
7 . . . a shaft support member (70 is a main member; 71 is a cylinder portion; and 72 is a through hole.)
8 . . . an urging member
9 . . . an installation portion of an auto body
17 . . . projections
18 . . . shaft holes (outer pivot portions)
23*a* . . . concave portions
23*b* . . . concave portions
44 . . . shaft portions (outer pivot portions)
45 . . . cylinder portions (inner pivot portions)
46 . . . gear portions on fin sides forming a gear mechanism)
50 . . . a gear on a shaft side forming a gear mechanism)
62 . . . a cylinder portion
63 . . . a flat plate portion (64 is a locking hole.)
65*a* . . . a first engagement portion (an engagement portion)
65*b* . . . a second engagement portion (an engagement portion)
65*c* . . . a third engagement portion (an engagement portion)
73 . . . a shaft portion (a connection portion)
74 . . . a projection
75 . . . a convex portion Incidentally, all contents of the specification, claims, drawings, and abstract of Japanese Patent Application No. 2016-133905 filed on Jul. 6, 2016 are cited in their entireties herein and are incorporated as a disclosure of the specification of the present invention.

What is claimed is:

1. An air flow direction regulation device, comprising: a plurality of fins turnably supported; an approximately cylindrical housing arranging an operation portion for regulating a direction of the fins and a gear mechanism; and
a case disposing the housing internally,
wherein each of the fins is turnably supported as support points by an outer pivot portion on a housing inner circumferential side and an inner pivot portion on a housing center axis line side, and includes a gear portion provided near the inner pivot portion,
the gear mechanism includes a gear integrally rotating with the operation portion through a shaft and engaging the gear portion of each fin, and
the housing includes a flexible shaft support member provided on a housing center axis line, and forming a connection portion fitting into the inner pivot portion of each fin, and a through hole to which the shaft is inserted to pass through in a skewered manner.

2. An air flow direction regulation device according to claim 1, wherein an outer circumferential face of the housing is formed in a convex spherical face, and includes a plurality of projections provided to project at portions equally dividing a circumference of the convex spherical face,
an inner circumferential face of the case is partially formed in a concave spherical face corresponding to the convex spherical face, and includes flexible spacers defining and forming concave portions provided to correspond to the projections, and concaved grooves arranged in the concave portions and slidingly fitting into the projections, and
in a state wherein the projections fit into the grooves of the spacers, the housing is regulated to tilt to top and bottom, and right and left relative to the case.

3. An air flow direction regulation device according to claim 2, wherein the concave portions and the spacers are provided at four portions approximately equally dividing a circumference, and groove widths of the concaved grooves are formed by two different types of the groove widths.

4. An air flow direction regulation device according to claim 2, wherein the case is divided into a front case and a back case, and the concave portion and the spacer are disposed across the front and back cases.

5. An air flow direction regulation device according to claim 1, wherein the connection portion of the shaft support member is a shaft portion, and the inner pivot portion of the fin is a cylinder portion fittable into the shaft portion and forming the gear portion at a circumference.

6. An air flow direction regulation device according to claim 1, wherein facing end faces of the operation portion and the shaft support member include a convex portion provided on one side thereof, and a plurality of engagement portions provided on another side to engage with and disengage from the convex portion, and by a rotation of the operation portion, the engagement portion engaging the convex portions is switched to vary a direction of the fin.

7. An air flow direction regulation device according to claim 6, wherein the engagement portions include a first engagement portion engaging the convex portion when each fin is disposed almost parallel to the housing center axis line; a second engagement portion engaging the convex portion when each fin is almost disposed obliquely; and a third engagement portion engaging the convex portion when each fin is disposed to be almost right-angled.

8. An air flow direction regulation device according to claim 1, further comprising an urging member urging the shaft support member to an operation portion side.

* * * * *